US009447753B2

(12) United States Patent
Kuribayashi et al.

(10) Patent No.: US 9,447,753 B2
(45) Date of Patent: Sep. 20, 2016

(54) BLOW-BY GAS VENTILATION DEVICE (75) Inventors: Shujiro Kuribayashi, Toyota (JP); Teru Ogawa, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 14/355,486

(22) PCT Filed: Nov. 15, 2011

(86) PCT No.: PCT/JP2011/076316
§ 371 (c)(1),
(2), (4) Date: Apr. 30, 2014

(87) PCT Pub. No.: WO2013/073010
PCT Pub. Date: May 23, 2013

(65) Prior Publication Data
US 2015/0053188 A1 Feb. 26, 2015

(51) Int. Cl.
F02B 25/06 (2006.01)
F02M 25/06 (2016.01)
F01M 13/02 (2006.01)
F02B 37/18 (2006.01)
F01M 13/00 (2006.01)

(52) U.S. Cl.
CPC ............ F02M 25/06 (2013.01); F01M 13/00 (2013.01); F01M 13/021 (2013.01); F02B 37/183 (2013.01); F01M 2013/026 (2013.01); F01M 2013/027 (2013.01); Y02T 10/121 (2013.01); Y02T 10/144 (2013.01)

(58) Field of Classification Search
CPC ............... F01M 13/00; F01M 13/021; F01M 2013/026; F02B 37/00; F02B 37/16; F02B 37/183; F02M 25/06; Y02T 10/121; Y02T 10/144

USPC ................................ 123/572–574
See application file for complete search history.

(56) References Cited

U.S. PATENT DOCUMENTS

| 3,092,091 A * | 6/1963 | Bosley ................. F01M 13/025 123/574 |
| 5,755,283 A * | 5/1998 | Yates ........................ F24D 3/18 165/297 |
| 6,640,793 B1 * | 11/2003 | Kabat .................... F02M 25/06 123/574 |
| 7,810,328 B2 * | 10/2010 | Goebelbecker ....... F01N 13/107 123/562 |
| 2008/0077304 A1 * | 3/2008 | Suzuki .................. F02B 37/013 701/102 |
| 2008/0103667 A1 * | 5/2008 | Suzuki .................... B60T 17/02 701/70 |
| 2008/0110443 A1 * | 5/2008 | Hirano ................. F01M 13/021 123/572 |

(Continued)

FOREIGN PATENT DOCUMENTS

JP   A-2009-156239   7/2009
JP   A-2009-299645   12/2009

(Continued)

Primary Examiner — Marguerite McMahon
Assistant Examiner — Tea Holbrook
(74) Attorney, Agent, or Firm — Oliff PLC (57) ABSTRACT A bypass passage connecting an upstream portion and a downstream portion of a compressor of a turbocharger is provided in an air intake passage of an internal combustion engine. An ejector, which utilizes the intake air flowing in the bypass passage as a drive gas and thereby venting the blow-by gas generated by the internal combustion engine, is installed in the bypass passage. When the internal combustion engine is at a low temperature at which the oil is easily degraded by the blow-by gas, the flow rate of the intake air flowing in the bypass passage, that is, the flow rate of the drive gas of the ejector, is increased.

14 Claims, 5 Drawing Sheets

(56) References Cited

U.S. PATENT DOCUMENTS

| | | | |
|---|---|---|---|
| 2008/0196409 A1* | 8/2008 | Goebelbecker | F01N 13/107 60/612 |
| 2008/0257320 A1* | 10/2008 | Asanuma | F02M 25/06 123/573 |
| 2009/0288392 A1* | 11/2009 | Yang | F01N 3/0226 60/274 |
| 2009/0308364 A1* | 12/2009 | Konohara | F01M 13/022 123/572 |
| 2010/0012103 A1* | 1/2010 | Lewis | F02M 25/06 123/574 |
| 2011/0073082 A1 | 3/2011 | Hattori et al. | |
| 2011/0239965 A1* | 10/2011 | Ingelfinger | F01M 13/023 123/41.86 |
| 2012/0192558 A1* | 8/2012 | Takamiya | F02B 33/42 60/600 |
| 2012/0247438 A1* | 10/2012 | Konohara | F01M 13/022 123/559.1 |

FOREIGN PATENT DOCUMENTS

| | | |
|---|---|---|
| JP | A-2010-151087 | 7/2010 |
| JP | A-2011-094557 | 5/2011 |

* cited by examiner

Fig.1

⇒ Flow of Drive Gas
⇒ Flow of Blow-by Gas
⇒ Flow of Blow-by Gas + Drive Gas

⇒ Flow of Drive Gas
⇒ Flow of Blow-by Gas
⇒ Flow of Blow-by Gas + Drive Gas

Fig.8

⟹ Flow of Drive Gas
⟹ Flow of Blow-by Gas
⟹ Flow of Blow-by Gas + Drive Gas

BLOW-BY GAS VENTILATION DEVICE

TECHNICAL FIELD

The present invention relates to a blow-by gas ventilation device applied to an internal combustion engine having an intake passage, in which a forced-induction device, which compresses intake air, and a bypass passage, which connects a portion at an upstream side and a portion at a downstream side of the forced-induction device, are provided. The blow-by gas ventilation device includes an ejector that operates by using intake air flowing through the bypass passage as a drive gas to vent blow-by gas generated by the internal combustion engine.

BACKGROUND ART

In an internal combustion engine, some of air-fuel mixture introduced into a combustion chamber leaks into the crankcase through the gap between the piston and the cylinder. The leaked air-fuel mixture, which is referred to as blow-by gas, causes degradation of oil. Therefore, in an internal combustion engine installed in a vehicle, ventilation of the blow-by gas is performed using the negative pressure of intake air to draw the blow-by gas inside the crankcase. The blow-by gas drawn from the crankcase is incorporated in the intake air and the blow-by gas is treated by being combusted together with new air-fuel mixture inside the combustion chamber.

In an internal combustion engine provided with a forced-induction device, such as a turbocharger, the ventilation of the blow-by gas using the drawing-in by the intake negative pressure cannot be performed during forced induction, at which the intake air pressure is positive. Therefore, conventionally, a blow-by gas ventilation device, such as that described in Patent Document 1, has been proposed. The blow-by gas ventilation device described in this document includes a bypass passage, which connects portions of an intake passage at an upstream side and a downstream side of a forced-induction device, and an ejector installed in the bypass passage. The ejector is a device that draws an intake gas using a negative static pressure formed about a jet flow of drive gas of which the flow velocity is increased. With this conventional blow-by gas ventilation device, the ejector is installed so that the intake air flowing through the bypass passage operates as the drive gas to draw the blow-by gas inside the crankcase.

In the blow-by gas ventilation device, which includes such an ejector, during forced induction operation of the internal combustion engine, the intake air flows through the bypass passage due to the internal differential pressure between intake passage portions upstream and downstream of the forced-induction device. In this process, the ejector operates using the intake air flowing through the bypass passage as the drive gas to draw the blow-by gas from the crankcase. The blow-by gas drawn from the crankcase is introduced, together with the intake air flowing through the bypass passage, into the portion of the intake passage at the upstream side of the forced-induction device.

PRIOR ART DOCUMENTS

Patent Documents

Patent Document 1: Japanese Laid-Open Patent Publication No. 2009-299645

SUMMARY OF THE INVENTION

Problems that the Invention is to Solve

In the conventional blow-by gas ventilation device, a sufficient flow rate of the drive gas supplied to the ejector, that is, a sufficient intake air flow rate in the bypass passage must be ensured to perform sufficient ventilation of the blow-by gas during the forced induction operation of the internal combustion engine. However, when the flow rate of the ejector drive gas is increased, the amount of intake air supplied to the combustion chamber of the internal combustion engine is decreased correspondingly. Although the forced induction ratio of the forced-induction device must thus be increased to maintain the output of the internal combustion engine, this increases the drive loss of the forced-induction device and degrades the fuel efficiency of the internal combustion engine.

An objective of the present invention is to provide a blow-by gas ventilation device with which degradation of fuel efficiency of the internal combustion engine that accompanies the ventilation of blow-by gas can be suppressed favorably while suppressing degradation of oil due to the blow-by gas.

Means for Solving the Problems

A blow-by gas ventilation device of the present invention is applied to an internal combustion engine having an intake passage, in which a forced-induction device, which compresses intake air, and a bypass passage, which connects a portion at an upstream side and a portion at a downstream side of the forced-induction device, are provided in the intake passage. The blow-by gas ventilation device includes an ejector that operates by using intake air flowing through the bypass passage as a drive gas to vent blow-by gas generated by the internal combustion engine.

In such a blow-by gas ventilation device, the ejector operates using, as the drive gas to vent the blow-by gas generated in the internal combustion engine, the intake air, which flows through the bypass passage due to the differential pressure between the portions of the intake passage at the upstream side and the downstream side of the forced-induction device. When in order to improve the ventilation ability of the blow-by gas ventilation device, the flow rate of the drive gas of the ejector, that is, the flow rate of the intake air flowing in the bypass passage is increased, the amount of intake air supplied to the combustion chamber of the internal combustion engine is decreased correspondingly. The forced induction ratio of the forced-induction device must thus be increased to maintain the output of the internal combustion engine. This increases the drive loss of the internal combustion engine spent on driving the forced-induction device and degrades the fuel efficiency of the internal combustion engine.

In this respect, a first blow-by gas ventilation device according to the present invention is configured such that the flow rate of the drive gas is increased in a state where degradation of oil due to the blow-by gas tends to progress. With this blow-by gas ventilation device, in the state where the degradation of oil due to the blow-by gas tends to progress, the flow rate of the ejector drive gas is increased to improve the blow-by gas ventilation ability. On the other hand, in a state where the degradation of oil due to the blow-by gas is not likely to progress, the flow rate of the ejector drive gas is not increased. Therefore, even while suppressing the degradation of oil due to the blow-by gas, the increase of the ejector drive gas flow rate that is accompanied by the degradation of the fuel efficiency of the internal combustion engine is suppressed other than when necessary. The degradation of the fuel efficiency of the internal combustion engine that accompanies the ventilation of the blow-by gas can thus be suppressed favorably while suppressing the degradation of oil due to the blow-by gas.

A second blow-by gas ventilation device according to the present invention is configured such that flow rate increasing control for increasing the flow rate of the drive gas is performed when an operation range of the internal combustion engine transitions from a natural aspiration range to a forced induction range. When in a state where degradation of oil due to the blow-by gas tends to progress, the increment of the drive gas flow rate in the flow rate increasing control is increased in comparison to that when not in the state. When the operation range of the internal combustion engine transitions from the natural aspiration range to the forced induction range, the blow-by gas ventilation using the intake negative pressure cannot be performed. Also, if the forced-induction device is controlled due to a course of events, the differential pressure in the intake passage between the upstream side and the downstream side of the forced-induction device will not increase for a while after the transition to the forced induction range, and the blow-by gas ventilation using the ejector cannot be performed sufficiently because the flow rate of the intake air flowing through the bypass passage, that is, the flow rate of the ejector drive gas is small. The blow-by gas ventilation thus stagnates temporarily when the transition from the natural aspiration range to the forced induction range takes place. Such a stagnation period of ventilation when the transition to the forced induction range takes place can be cancelled or shortened by controlling the forced-induction device to forcibly increase the forced induction ratio to increase the intake air flow rate in the bypass passage and thus the ejector drive gas flow rate. However, if such increase of the forced induction ratio is performed needlessly, the degree of degradation of fuel efficiency increases. In regard to this point, in the blow-by gas ventilation device according to the second aspect, the increment of the drive gas flow rate in accordance with the transition of the operation range of the internal combustion engine from the natural aspiration range to the forced induction range is made large in the state where the degradation of oil due to the blow-by gas tends to progress and made small otherwise. Therefore, even while suppressing the degradation of oil due to the blow-by gas, the increase of the ejector drive gas flow rate that is accompanied by the degradation of the fuel efficiency of the internal combustion engine is suppressed other than when necessary. The degradation of the fuel efficiency of the internal combustion engine that accompanies the ventilation of the blow-by gas can thus be suppressed favorably while suppressing the degradation of oil due to the blow-by gas.

Further, a third blow-by gas ventilation device according to the present invention is configured such that the flow rate of the drive gas is increased when the internal combustion engine is at a low temperature. When the internal combustion engine is at a low temperature, condensation occurs inside the crankcase and the water materialized by the condensation and the blow-by gas react to form nitric acid water. Degradation of the oil inside the crankcase progresses due to the nitric acid water. The degradation of oil due to the blow-by gas thus tends to progress when the internal combustion engine is at a low temperature. In regard to this point, in the blow-by gas ventilation device according to the present invention, the drive gas flow rate in the ejector is increased to improve the blow-by gas ventilation ability when the internal combustion engine is at a low temperature. On the other hand, when the internal combustion engine is at a high temperature and a high ventilation ability is not strongly required, the flow rate of the ejector drive gas is not increased. Therefore, even while suppressing the degradation of oil due to the blow-by gas, the increase of the ejector drive gas flow rate that is accompanied by the degradation of the fuel efficiency of the internal combustion engine is suppressed other than when necessary. The degradation of the fuel efficiency of the internal combustion engine that accompanies the ventilation of the blow-by gas can thus be suppressed favorably while suppressing the degradation of oil due to the blow-by gas.

A fourth blow-by gas ventilation device according to the present invention is configured such that flow rate increasing control for increasing the flow rate of the drive gas is performed when an operation range of the internal combustion engine transitions from a natural aspiration range to a forced induction range. When the internal combustion engine is at a low temperature, the increment of the drive gas flow rate in the flow rate increasing control is increased in comparison to that when the internal combustion engine is not at a low temperature. With this blow-by gas ventilation device, the ejector drive gas flow rate is increased in accordance with the transition of the operation range of the internal combustion engine from the natural aspiration range to the forced induction range. Although, as mentioned above, the stagnation of the blow-by gas ventilation that occurs when the operation range of the internal combustion engine transitions from the natural aspiration range to the forced induction range can be suppressed by forcibly increasing the ejector drive gas flow rate when the transition takes place, such increase of the ejector drive gas flow rate is accompanied by the degradation of the fuel efficiency. On the other hand, as mentioned above, when the internal combustion is at a low temperature, the degradation of oil due to the blow-by gas tends to progress and it is necessary to perform ventilation of the blow-by gas inside crankcase more actively.

In regard to this point, in the blow-by gas ventilation device according to the fourth aspect, the increment of the drive gas flow rate in accordance with the transition to the forced induction range is made large when the internal combustion engine is at a low temperature and made small otherwise. Therefore, even while suppressing the degradation of oil due to the blow-by gas, the increase of the ejector drive gas flow rate that is accompanied by the degradation of the fuel efficiency of the internal combustion engine is suppressed other than when necessary. The degradation of the fuel efficiency of the internal combustion engine that accompanies the ventilation of the blow-by gas can thus be suppressed favorably while suppressing the degradation of oil due to the blow-by gas.

The increase of the drive gas flow rate in the blow-by gas ventilation device according to any of the first to fourth aspects can be performed, for example, by the following modes.

If the present invention is applied to an internal combustion engine in which the forced-induction device is a turbocharger including a waste gate valve that adjusts the flow rate of exhaust that bypasses an exhaust turbine, the drive gas flow rate can be increased by reducing the opening degree of the waste gate valve.

If the ventilation device of the present invention is to be applied to an internal combustion engine that includes an assist mechanism that utilizes electricity or compressed air, to assist the forced induction operation, the flow rate of the ejector drive gas can be increased by increasing the amount of forced induction operation assist by the assist mechanism.

If the present invention is applied to an internal combustion engine in which the forced-induction device is a variable nozzle turbocharger including a variable nozzle vane that adjusts the flow momentum of exhaust blown onto an exhaust turbine, the drive gas flow rate can be increased by reducing the opening degree of the variable nozzle vane.

A valve for adjusting the flow rate of intake air flowing through the bypass passage can be provided in the bypass passage, and the drive gas flow rate can be increased by increasing the opening degree of the valve. In this case, by arranging such a temperature sensitive valve, which operates in response to the temperature of the internal combustion engine, the increase/decrease of the intake air flow rate in the bypass passage in accordance with the temperature of the internal combustion engine can be performed autonomously without control from the exterior.

The throttle opening of the internal combustion engine is preferably reduced when the drive gas flow rate is increased in the blow-by gas ventilation device according to any of the first to fourth aspects. When the forced induction ratio is increased to increase the drive gas flow rate, the amount of intake air introduced into the combustion chamber of the internal combustion engine is also increased and an unnecessary increase of torque occurs. Therefore, by reducing the throttle opening of the internal combustion engine in accordance with the increase of the drive gas flow rate, the increase of the drive gas flow rate can be performed more efficiently while suppressing unnecessary torque increase.

On the other hand, the blow-by gas ventilation device according to a fifth aspect of the present invention has a temperature sensitive valve, the opening degree of which is increased when the internal combustion engine is at a low temperature, provided in the bypass passage. With this blow-by gas ventilation device, when the internal combustion engine is at a low temperature at which the degradation of oil due to the blow-by gas tends to progress due to condensation of water inside the crankcase, the opening degree of the valve provided in the bypass passage increases and the intake air flow rate in the bypass passage, that is, the ejector drive gas flow rate is increased. The blow-by gas ventilation ability is thus improved when the degradation of oil due to the blow-by gas tends to progress. On the other hand, when the temperature of the internal combustion engine is not low and a high ventilation ability is not strongly required, the opening degree of the valve provided in the bypass passage is not increased and the ejector drive gas flow rate is not increased. Therefore, even while suppressing the degradation of oil due to the blow-by gas, the increase of the ejector drive gas flow rate that is accompanied by the degradation of the fuel efficiency of the internal combustion engine is suppressed other than when necessary. The degradation of the fuel efficiency of the internal combustion engine that accompanies the ventilation of the blow-by gas can thus be suppressed favorably while suppressing the degradation of oil due to the blow-by gas. Moreover, in the present blow-by gas ventilation device, the increase/decrease of the drive gas in accordance with the temperature of the internal combustion engine can be performed autonomously without control from the exterior.

MODES FOR CARRYING OUT THE INVENTION

First Embodiment

Figure 1:
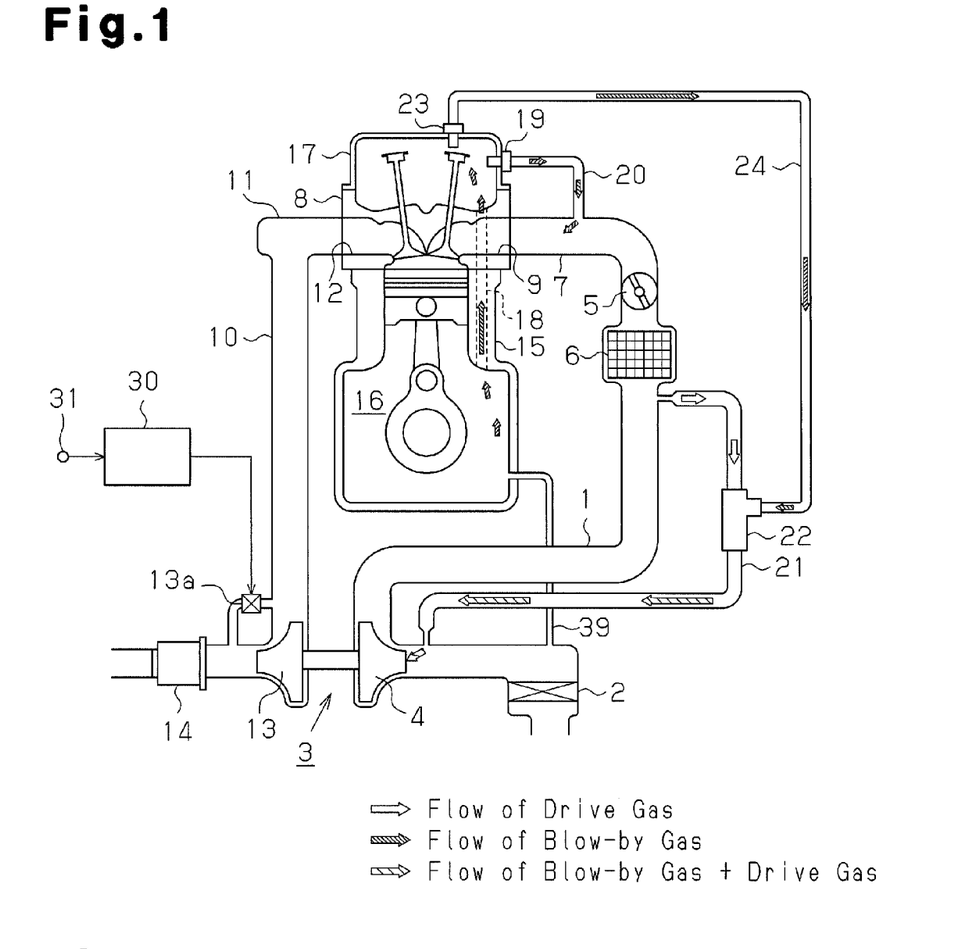
FIG. 1 is a schematic diagram of the configuration of a blow-by gas ventilation device according to a first embodiment of the present invention and an internal combustion engine to which the device is applied.
Figure 2:
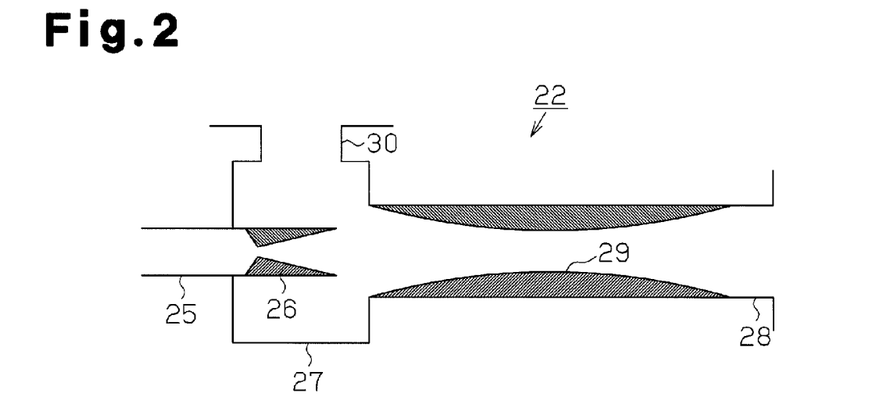
FIG. 2 is a schematic diagram of the configuration of an ejector provided in the blow-by gas ventilation device according to the same embodiment.
Figure 3:
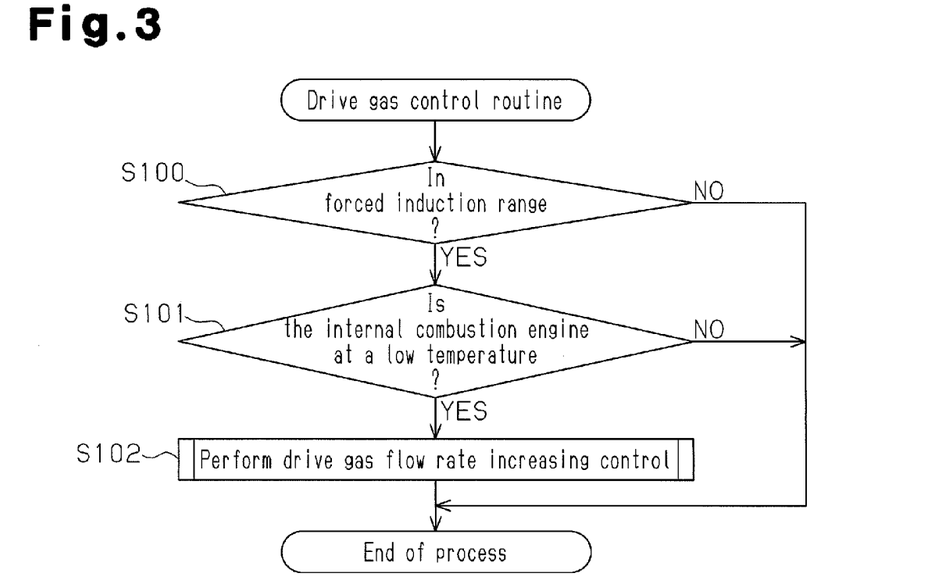
FIG. 3 is a flowchart of a flow rate increasing control process procedure applied in the same embodiment.

A blow-by gas ventilation device according to a first embodiment of the present invention will now be described with reference to FIG. 1 to FIG. 3. The blow-by gas ventilation device according to the present embodiment is applied to an internal combustion engine including a turbocharger with waste gate valve as a forced-induction device.

The configuration of the blow-by gas ventilation device according to the present embodiment will first be described with reference to FIG. 1.

As shown in the drawing, an air cleaner 2 for cleaning intake air, a compressor 4 of a turbocharger 3, an intercooler 6 for cooling the intake air, the temperature of which has been increased by compression by the compressor 4, and a throttle valve 5 for adjusting the intake air flow rate are installed in that order from the upstream side in an intake passage 1 of an internal combustion engine. The intake passage 1 is connected, via an intake manifold 7 that distributes the intake air among respective cylinders, to air intake ports 9 of the respective cylinders formed in a cylinder head 8 of the internal combustion engine.

On the other hand, an exhaust passage 10 of the internal combustion engine is connected, via an exhaust manifold 11 merging the exhaust from the respective cylinders, to exhaust ports 12 of the respective cylinders formed in the cylinder head 8. An exhaust turbine 13 of the turbocharger 3 is provided in the exhaust passage 10. The exhaust turbine 13 drives the compressor 4 by the blown exhaust to compress the intake air. The exhaust turbine 13 is also provided with a waste gate valve 13a that adjusts the flow rate of exhaust that bypasses the exhaust turbine 13. Further, a catalytic converter 14 that purifies the exhaust is provided downstream the exhaust turbine 13 in the exhaust passage 10.

In the cylinder head 8 and a cylinder block 15 of the internal combustion engine, a blow-by gas passage 18 is formed that puts a crankcase 16 and a head cover 17 in communication. Also, a first PCV (positive crankcase ventilation) hose 20 is connected via a first PCV valve 19 to the head cover 17. The interior of the head cover 17 is put in communication with the intake manifold 7 by the first PCV hose 20. The crankcase 16 is connected via a fresh air introduction passage 39 to a portion of the intake passage 1 at the upstream side of the compressor 4.

Further, the blow-by gas ventilation device according to the present embodiment is provided with a bypass passage 21 connecting a portion of the intake passage 1 at the downstream side of the compressor 4 and a portion of the intake passage 1 at the upstream side of the compressor 4. An ejector 22 is located in the bypass passage 21. The ejector 22 operates using the intake air flowing through the bypass passage 21 as a drive gas to perform ventilation of blow-by gas generated in the internal combustion engine. A second PCV hose 24 is further connected to the ejector 22. A tip end of the second PCV hose 24 is connected via a second PCV valve 23 to the head cover 17.

The ventilation of blow-by gas in the internal combustion engine is controlled by an electronic control unit 31. Detection results of various sensors detecting the operation state of the internal combustion engine, such as a water temperature sensor 32 detecting the temperature Tw of cooling water of the internal combustion engine, are input into the electronic control unit 31. The electronic control unit 31 controls the first PCV valve 19, the second PCV valve 23, and the waste gate valve 13a of the exhaust turbine 13 in accordance with the detection results of the sensors to perform blow-by gas ventilation in accordance with the engine operation state.

The configuration of the ejector 22 installed in the bypass passage 21 will now be described with reference to FIG. 2. As shown in the drawing, the ejector 22 includes a supply port 25 that is connected via the bypass passage 21 to a portion of the intake passage 1 at the downstream side of the intercooler 6. The supply port 25 is provided with a nozzle 26 that narrows the flow passage area of the supply port 25. A tip end of the supply port 25 opens inside a vacuum chamber 27. A discharge port 28, with a diffuser 29 installed therein, is provided on an extension of supply port 25 at the right side in the drawing of the vacuum chamber 27. The discharge port 28 is connected via the bypass passage 21 to a portion of the intake passage 1 at the upstream side of the compressor 4. Further, a vacuum port 30 is provided at a side portion (upper side in the drawing) of the vacuum chamber 27. The vacuum port 30 is connected via the second PCV hose 24 to the interior of the head cover 17 and further to the crankcase 16 via the blow-by gas passage 18.

Further, in the blow-by gas ventilation device according to the present embodiment, the electronic control unit 31 performs control of the flow rate of the drive gas supplied to the ejector 22. The control of the drive gas flow rate is performed through a process of a drive gas control routine shown in FIG. 3. The process of this routine is executed repeatedly by the electronic control unit 31 at every predetermined control cycle during startup and during operation of the internal combustion engine.

When the process of the routine is started, first, whether or not the internal combustion engine is being operated in a forced induction range is checked in step S100. According to the present embodiment, it is determined that the internal combustion engine is being operated in the forced induction range when the load factor of the internal combustion engine is no less than 100%. If the internal combustion engine is being operated in a natural aspiration range (S100: NO), the process of the routine is ended as it is.

On the other hand, if the internal combustion engine is being operated in the forced induction range (S100: YES), the process proceeds to step S101. In step S101, it is checked whether or not the internal combustion engine is at a low temperature. The determination here is made using the temperature Tw of the cooling water of the internal combustion engine as an index value of the internal combustion engine temperature. If the temperature Tw of the cooling water is no more than a prescribed determination value $\alpha$, it is determined that the internal combustion engine is at a low temperature. The determination value $\alpha$ is set to the maximum value of a temperature range in which the progress of oil degradation due to condensation inside the crankcase 16 becomes a problem.

If the internal combustion engine is not at a low temperature (S101: NO), the process of the routine is ended as it is. On the other hand, if the internal combustion engine is at a low temperature (S101: YES), the process proceeds to step S102. In step S102, a flow rate increasing control for increasing the drive gas flow rate in the ejector 22 is performed and then the process of the routine is ended.

In the present embodiment, the flow rate increasing control performed in step S102 is performed by reducing the opening degree of the waste gate valve 13a. When the opening degree of the waste gate valve 13a is reduced, the flow rate of the exhaust that bypasses the exhaust turbine 13 decreases, the flow rate of the exhaust blown onto the exhaust turbine 13 increases, and the forced induction ratio of the turbocharger 3 thus increases. In general, the opening degree of the waste gate valve 13a is set to a value that allows the forced induction ratio of the turbocharger 3 to be the minimum limit value at which the required torque or required output of the internal combustion at that time is obtained. By reducing the opening degree of the waste gate valve 13a further from such an opening degree, the forced induction ratio of the turbocharger 3 is increased, the differential pressure between portions in the intake passage 1 at the upstream side and the downstream side of the compressor 4 is increased, and the flow rate of the intake air flowing through the bypass passage 21, that is, the drive gas flow rate in the ejector 22 is thus increased.

Depending on the increase of the forced induction ratio of the turbocharger 3 due to the reduction of the opening degree of the waste gate valve 13a in the present process, the amount of air introduced into a combustion chamber of the internal combustion engine may increase and cause an unnecessary torque increase. Therefore, in the present embodiment, the opening degree of the throttle valve 5 is reduced at the same time as the present reduction of the opening degree of the waste gate valve 13a to suppress the unnecessary torque increase of the internal combustion engine.

The ventilation operation by the blow-by gas ventilation device configured as described above will now be described.

When the operation range of the internal combustion engine is in the natural aspiration range and the intake negative pressure is large enough to enable suction of the blow-by gas inside the crankcase 16, the electronic control unit 31 opens the first PCV valve 19 and closes the second PCV valve 23. The blow-by gas inside the crankcase 16 at this time is drawn into the intake passage 1 through the blow-by gas passage 18, the head cover 17, and the first PCV hose 20 by the negative pressure inside the intake passage 1.

On the other hand, when the operation range of the internal combustion engine is in the forced induction range, the electronic control unit 31 closes the first PCV valve 19 and opens the second PCV valve 23. When forced induction by the turbocharger 3 is performed, the intake air flows through the bypass passage 21 from the portion of the intake passage 1 at the downstream side of the compressor 4 to the portion at the upstream side due to the differential pressure between the upstream and downstream of the compressor 4. In this process, at the ejector 22 provided in the bypass passage 21, the intake air flows from the supply port 25 to the discharge port 28 through the vacuum chamber 27. The intake air flowing in from the supply port 25 is accelerated by being throttled by the nozzle 26 and thereafter proceeds toward the entrance of the diffuser 29 through the vacuum chamber 27. In the vacuum chamber 27 at this time, a negative static pressure is generated by such a flow of the intake air. By this negative static pressure and the viscosity of the intake air, peripheral gas is drawn into a jet flow that is jetted into the entrance of the diffuser 29. Consequently, the blow-by gas is drawn from inside the crankcase 16 that is connected to the vacuum port 30 through the blow-by gas passage 18, the head cover 17, and the second PCV hose 24. The blow-by gas drawn from inside the crankcase 16 is introduced, together with the intake air flowing through the bypass passage 21, into the portion of the intake passage 1 at the upstream side of the compressor 4.

Therefore, in the blow-by gas ventilation device according to the present embodiment, ventilation of the blow-by gas is enabled by operation of the ejector 22 even during forced induction when the intake air pressure is positive. To improve the blow-by gas ventilation ability during such forced induction, the flow rate of the drive gas of the ejector 22, that is, the flow rate of the intake air flowing through the bypass passage 21 during the forced induction must be increased. However, when the flow rate of the drive gas of the ejector 22 is increased, the amount of intake air supplied to the combustion chamber of the internal combustion engine decreases correspondingly. The forced induction ratio of the turbocharger 3 must thus be increased to maintain the output of the internal combustion engine. When the forced induction ratio of the turbocharger 3, which performs forced induction using the flow momentum of the exhaust increases, the exhaust loss of the internal combustion engine increases and the fuel efficiency of the internal combustion engine degrades.

On the other hand, when the internal combustion engine is at a low temperature, condensation occurs inside the crankcase 16 and the water materialized by the condensation and the blow-by gas react to form nitric acid water. Degradation of the oil inside the crankcase 16 progresses due to the nitric acid water. Ventilation of the blow-by gas inside the crankcase 16 must thus be performed more actively when the internal combustion engine is at a low temperature. On the other hand, when the internal combustion engine is at a high temperature, the degradation of oil due to the blow-by gas does not progress as much as when the internal combustion engine is at a low temperature. The degradation of oil due to the blow-by gas can thus be suppressed by improving the blow-by gas ventilation ability only when the internal combustion engine is at a low temperature.

In regard to this point, in the blow-by gas ventilation device according to the present embodiment, the opening degree of the waste gate valve 13a is reduced and the drive gas flow rate in the ejector 22 is thereby increased when the internal combustion engine is at a low temperature at which the degradation of oil due to the blow-by gas tends to progress. The blow-by gas ventilation ability is thus improved in this state to suppress the degradation of oil due to the blow-by gas.

On the other hand, when the internal combustion engine is at a high temperature at which the degradation of oil due to the blow-by gas does not progress as much as when the internal combustion engine is at a low temperature, the drive gas flow rate in the ejector 22 is not increased. Therefore, even while suppressing the degradation of oil due to the blow-by gas, the increase of the drive gas flow rate in the ejector 22 that is accompanied by the degradation of the fuel efficiency of the internal combustion engine is suppressed other than when necessary.

The blow-by gas ventilation device according to the present embodiment described above provides the following advantages.

(1) According to the present embodiment, the flow rate increasing control for increasing the flow rate of the drive gas of the ejector 22 is performed when the internal combustion engine is at a low temperature at which the degradation of oil due to the blow-by gas tends to progress. The degradation of the fuel efficiency of the internal combustion engine that accompanies the ventilation of the blow-by gas can thus be suppressed favorably while suppressing the degradation of oil due to the blow-by gas.

(2) According to the present embodiment, the flow rate increasing control is performed by reducing the opening degree of the waste gate valve 13a of the turbocharger 3. The drive gas flow rate in the ejector 22 can thus be increased without newly adding a mechanism for adjusting the drive gas flow rate in the ejector 22.

(3) According to the present embodiment, the opening degree of the throttle valve 5 is reduced when the flow rate increasing control is performed. Unnecessary torque increase of the internal combustion engine that accompanies the increase of the drive gas flow rate in the ejector 22 can thus be suppressed.

Second Embodiment

A blow-by gas ventilation device according to a second embodiment of the present invention will now be described with reference to FIG. 4. In the second embodiment and each of the following embodiments, like or the same reference numerals are given to those components that are like or the same as the corresponding components of the first embodiment and detailed explanations are omitted.

As mentioned above, the blow-by gas ventilation using the intake negative pressure cannot be performed when the operation range of the internal combustion engine transitions from the natural aspiration range to the forced induction range. Also, the forced induction ratio of the turbocharger 3 does not rise immediately after the start of forced induction. Therefore, for a while after the start of forced induction, the differential pressure between the portions of the intake passage 1 at the upstream and downstream of the compressor 4 does not increase and the intake air flow rate in the bypass passage 21, that is, the drive gas flow rate in the ejector 22 is also low. Therefore, when the transition from the natural aspiration range to the forced induction range takes place, the blow-by gas ventilation stagnates temporarily. Therefore, in the present embodiment, a flow rate increasing control of forcibly increasing the drive gas flow rate in the ejector 22 is performed when the transition from the natural aspiration range to the forced induction range takes place to suppress the stagnation of ventilation immediately after the transition to the forced induction range.

However, such increase of the drive gas flow rate is accompanied by degradation of the fuel efficiency. Significant degradation of the fuel efficiency will thus be caused if such increase of the drive gas flow rate is performed unnecessarily each time the transition from the natural aspiration range to the forced induction range takes place. Therefore, in the present embodiment, whereas the increment of the drive gas flow rate by drive gas control is made large when the internal combustion engine is at a low temperature at which the degradation of oil due to the blow-by gas tends to progress, the increment of the drive gas flow rate by the flow rate increasing control is made small when the internal combustion engine is at a high temperature at which the degradation of oil is not much of a problem. The degradation of oil due to the blow-by gas is thereby suppressed effectively while suppressing the degradation of fuel efficiency.

Figure 4:
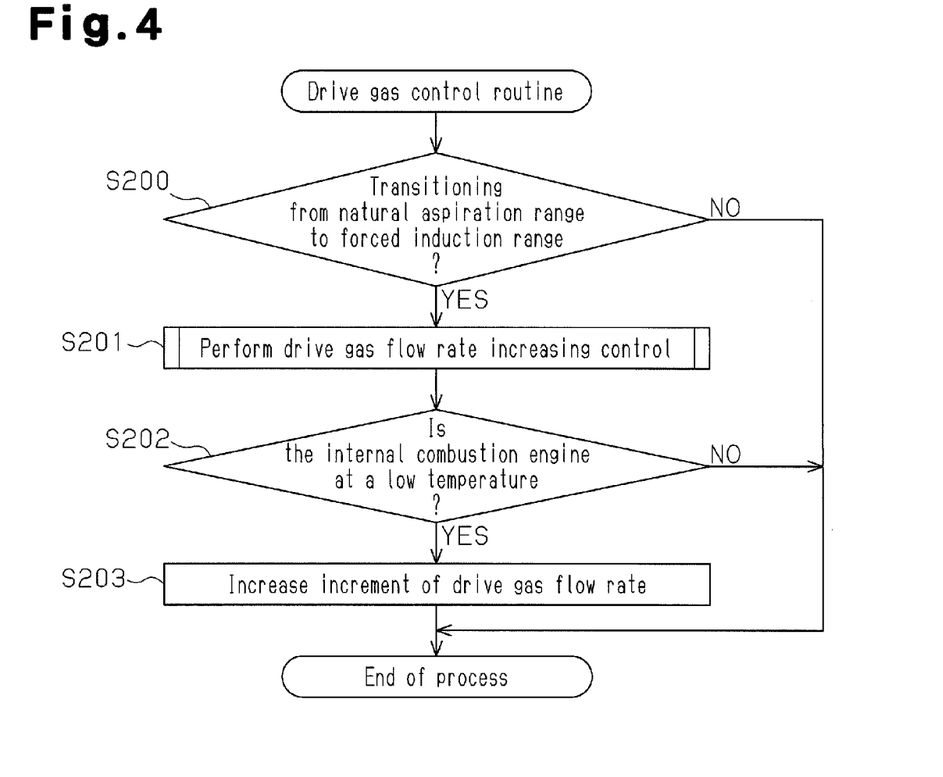
FIG. 4 is a flowchart of a flow rate increasing control process procedure applied in a second embodiment of the present invention.

Such increase of the drive gas flow rate is performed through a process of a drive gas control routine shown in FIG. 4. The process of this routine is executed repeatedly by the electronic control unit 31 at every predetermined control cycle during startup and operation of the internal combustion engine.

When the routine is started, first, whether or not the transition of the operation range of the internal combustion engine from the natural aspiration range to the forced induction range is taking place is checked in step S200. If the transition to the forced induction range is not taking place (S200: NO), the process of the routine is ended as it is.

On the other hand, if the transition to the forced induction range is taking place (S200: YES), the flow rate increasing control for increasing the drive gas flow rate in the ejector 22 is performed in step S201. The drive gas flow rate increasing control is performed by reducing the opening degree of the waste gate valve 13a in the present embodiment as well. The flow rate increasing control that is started here is continued until a sufficient amount of time elapses after the start of forced induction and the drive gas flow rate is increased to a level such that a flow rate necessary for ventilation will be ensured even when the waste gate valve 13a is controlled due to a course of events or until the engine operation range returns to the natural aspiration range. Together with the reduction of the opening degree of the waste gate valve 13a in the present process, the opening degree of the throttle valve 5 is reduced to maintain the torque of the internal combustion engine in the present embodiment as well.

Thereafter, in step S202, it is checked whether or not the internal combustion engine is at a low temperature. If the internal combustion engine is not at a low temperature (S202: NO), the process of the routine is ended as it is. On the other hand, if the internal combustion engine is at a low temperature (S202: YES), the increment of the drive gas flow rate in the ejector 22 in the flow rate increasing control is increased. That is, the opening degree of the waste gate valve 13a is reduced further. Thereafter, the process of the routine is ended.

The ventilation operation in the forced induction state of the blow-by gas ventilation device of the present invention when the operation range of the internal combustion engine transitions from the natural aspiration range to the forced induction range will now be described.

When the internal combustion engine is being operated in the natural aspiration range, the electronic control unit 31 opens the first PCV valve 19 and closes the second PCV valve 23. The blow-by gas inside the crankcase 16 at this time is drawn into the intake passage 1 through the blow-by gas passage 18, the head cover 17, and the first PCV hose 20 by the negative pressure inside the intake passage 1.

On the other hand, when the operation range of the internal combustion engine transitions from the natural aspiration range to the forced induction range, the electronic control unit 31 closes the first PCV valve 19 and opens the second PCV valve 23. If the waste gate valve 13a is controlled due to a course of events at this point, the differential pressure between the portions of the intake passage 1 at the upstream and downstream of the compressor 4 will not increase immediately and a state where the intake air flow rate in the bypass passage 21 is low is sustained for a while. Therefore, immediately after the transition to the forced induction range, a sufficient drive gas flow rate cannot be ensured in the ejector 22 and the blow-by gas ventilation stagnates temporarily.

In regard to this point, in the present embodiment, the opening degree of the waste gate valve 13a is reduced when such transition of the operation range of the internal combustion engine from the natural aspiration range to the forced induction range takes place and the differential pressure between portions of the intake passage 1 at the upstream and downstream of the compressor 4 is increased from immediately after the transition. Therefore, by such a differential pressure, the flow rate of the intake air flowing through the bypass passage 21, that is, the drive gas flow rate in the ejector 22 is increased in accordance with the transition of the operation range from the natural aspiration range to the forced induction range, and the blow-by gas ventilation ability is ensured quickly after the transition to the forced induction range.

Further, in the present embodiment, when the internal combustion engine is at a low temperature at which the degradation of oil due to the blow-by gas tends to progress, the opening degree of the waste gate valve 13a at this point is reduced further to thereby increase the increment of the drive gas flow rate in the ejector 22 by the flow rate increasing control. The blow-by gas ventilation ability at this point is thereby improved to suppress the degradation of oil due to the blow-by gas.

On the other hand, when the internal combustion engine is at a high temperature at which the degradation of oil due to the blow-by gas does not progress as much as when the internal combustion engine is at a low temperature, the increment of the drive gas flow rate in the ejector 22 by the flow rate increasing control is not increased as much as when the internal combustion engine is at a low temperature. Therefore, even while suppressing the degradation of oil due to the blow-by gas, the increase of the drive gas flow rate in the ejector 22, which is accompanied by the degradation of the fuel efficiency of the internal combustion engine, is suppressed other than when necessary.

The present embodiment described above provides the following advantages in addition to the advantages described in (2) and (3) above.

(4) According to the present embodiment, the drive gas flow rate in the ejector 22 is increased when the operation range of the internal combustion engine transitions from the natural aspiration range to the forced induction range, and the stagnation of the blow-by gas ventilation that accompanies the transition can thus be suppressed.

(5) According to the present embodiment, when the internal combustion is at a low temperature at which the degradation of oil due to the blow-by gas tends to progress, the amount by which the drive gas flow rate in the ejector 22 is increased when the transition to the forced induction range takes place is made greater than that when the internal combustion is at a high temperature. Therefore, even while suppressing the degradation of oil due to the blow-by gas, the increase of the drive gas flow rate in the ejector 22, which is accompanied by the degradation of the fuel efficiency of the internal combustion engine, is suppressed other than when necessary. The degradation of the fuel efficiency of the internal combustion engine that accompanies the ventilation of the blow-by gas can thus be suppressed favorably while suppressing the degradation of oil due to the blow-by gas.

Third Embodiment

A blow-by gas ventilation device according to a third embodiment of the present invention will now be described with reference to FIG. 5.

In the blow-by gas ventilation device according to each of the first and second embodiments applied to an internal combustion engine including a turbocharger with a waste gate valve 13a, the drive gas flow rate is increased by reducing the opening degree of the waste gate valve 13a. On the other hand, the blow-by gas ventilation device according to the present embodiment is applied to an internal combustion engine employing a turbocharger, which includes an assist mechanism that assists the forced induction operation, as the forced-induction device. In such a blow-by gas ventilation device, the drive gas flow rate in the ejector 22 can be increased by increasing the amount of forced induction operation assist by the assist mechanism.

Figure 5:
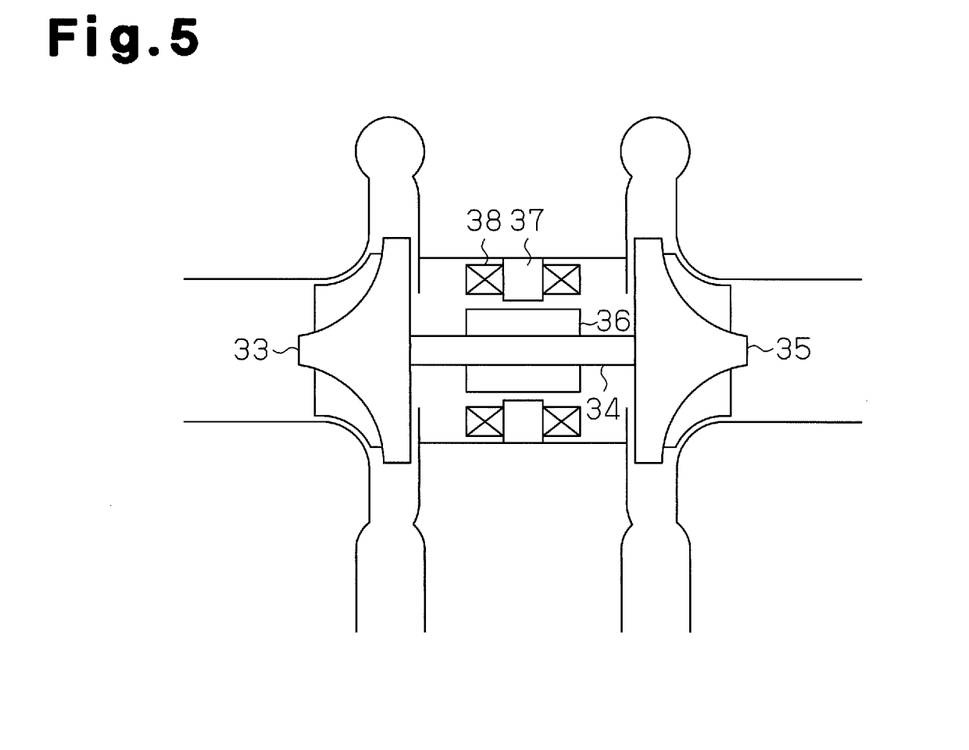
FIG. 5 is a schematic diagram of the configuration of a turbocharger with electric assist mechanism of an internal combustion engine to which a third embodiment of the present invention is applied.

According to the present embodiment, a turbocharger with electric assist mechanism shown in FIG. 5 is employed as the turbocharger with assist mechanism. As shown in the drawing, a compressor wheel 33 of the turbocharger is coupled to a turbine wheel 35 via a shaft 34. The turbocharger is provided with an electric assist mechanism made up of a rotor 36 fixed on the shaft 34 and a stator 37 provided about the rotor 36. The stator 37 of the electric assist mechanism is provided with a coil 38, and an assist drive force is applied to the rotor 36 in accordance with the energization of the coil 38.

In the turbocharger with electric assist mechanism, when the coil 38 is energized, the assist drive force generated by the energization of the coil 38 is added to the drive force generated by the blowing of exhaust onto the exhaust turbine wheel 35 and transmitted to the compressor wheel 33. Therefore, by the forced induction being assisted by the electric assist mechanism, the forced induction pressure can be increased even at startup, when the engine rotation speed is low and the effect of the exhaust turbine is not exhibited readily.

In the blow-by gas ventilation device according to the present embodiment applied to the internal combustion engine that includes the turbocharger with electric assist mechanism, the flow rate increasing control of step S102 of FIG. 3 or step S201 of FIG. 4 is performed in the manner shown below. That is, according to the present embodiment, the energization amount of the coil 38 is made greater than ordinary to increase the amount of forced induction operation assist by the electric assist mechanism to increase the drive gas flow rate in the ejector 22. Specifically, when the amount of forced induction operation assist by the electric assist mechanism is increased, the forced induction ratio of the turbocharger increases and the differential pressure between portions of the intake passage 1 at the upstream side and the downstream side of the compressor 4 increases. By the increase of the differential pressure, the flow rate of the intake air flowing in reverse through the bypass passage 21, that is, the drive gas flow rate in the ejector 22 is increased.

In the present embodiment as well, The drive gas flow rate in the ejector 22 can be increased when the internal combustion engine is at a low temperature at which the degradation oil due to the blow-by gas tends to progress and increasing of the drive gas flow rate in the ejector 22 when the operation range of the internal combustion engine is in the forced induction range. The degradation of the fuel efficiency of the internal combustion engine that accompanies the ventilation of the blow-by gas can thus be suppressed favorably even while suppressing the degradation of oil due to the blow-by gas in the present embodiment as well.

As the turbocharger assist mechanism, assist mechanisms other than the electric assist mechanism, such as an air assist mechanism that assists the forced induction operation using compressed air, are also known. An air assist mechanism stores compressed air obtained by forced induction during high load operation, of the internal combustion engine, in a container and blows the compressed air as necessary onto the exhaust turbine wheel of the turbocharger to assist the forced induction operation. The forced induction operation assist amount can be increased by increasing the amount of compressed air blown onto the exhaust turbine wheel to more than ordinary to perform the flow rate increasing control of step S102 of FIG. 3 or step S104 of FIG. 4 with such a turbocharger with air assist mechanism as well.

Fourth Embodiment

Figure 6:
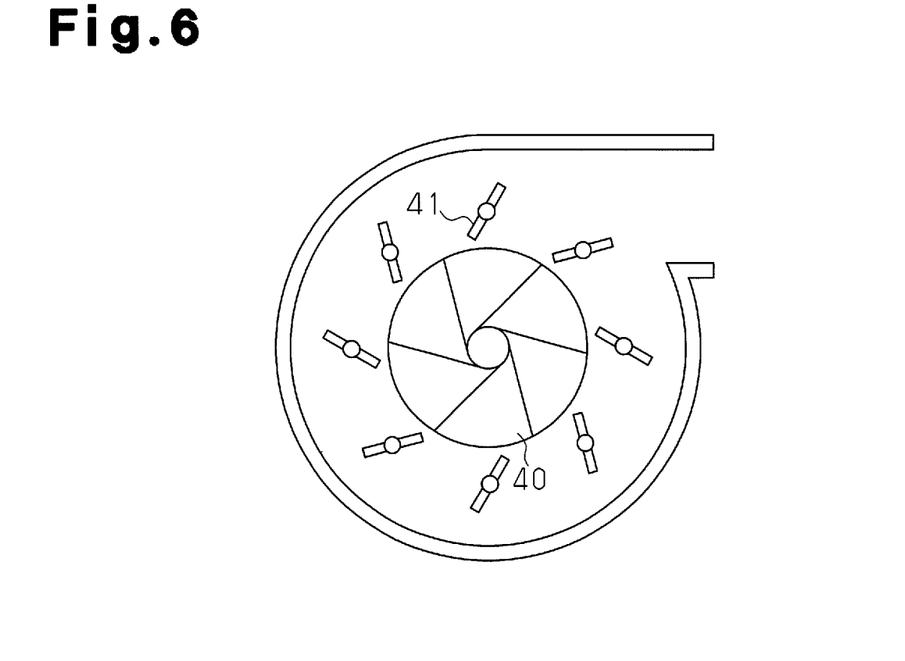
FIG. 6 is a schematic diagram of the configuration of an exhaust turbine of a variable nozzle turbocharger of an internal combustion engine to which a fourth embodiment of the present invention is applied.

A blow-by gas ventilation device according to a fourth embodiment of the present invention will now be described with additional reference to FIG. 6.

The blow-by gas ventilation device according to the present embodiment is applied to an internal combustion engine that includes a variable nozzle turbocharger as the forced-induction device. As shown in FIG. 6, a plurality of variable nozzle vanes 41 is provided to surround the periphery of an exhaust turbine wheel 40 of an exhaust turbine of the variable nozzle turbocharger. The variable nozzle vanes 41 are driven by an actuator 42 to change the opening degree to change the opening area of exhaust turbine blades of the exhaust turbine. Specifically, when the opening degree of the variable nozzle vanes 41 is decreased, the opening area of the exhaust turbine blades of the exhaust turbine decreases and the flow velocity of the exhaust blown onto the exhaust turbine wheel 40 is increased. The forced induction efficiency of the turbocharger is thereby improved. On the other hand, when the opening degree of the variable nozzle vanes 41 is increased, the opening area of the exhaust turbine blades of the exhaust turbine increases, the throttling of the exhaust passage is relaxed, and the exhaust pressure is thus decreased.

In the blow-by gas ventilation device according to the present embodiment applied to the internal combustion engine that includes a variable nozzle turbocharger, the flow rate increasing control of step S102 of FIG. 3 or step S201 of FIG. 4 is performed in the manner shown below. That is, according to the present embodiment, the opening degree of the variable nozzle vanes 41 is made smaller than ordinary to increase the flow velocity of the exhaust blown onto the exhaust turbine wheel 40 to thereby increase the drive gas flow rate in the ejector 22. Specifically, when the opening degree of the variable nozzle vanes 41 is made smaller than ordinary, the forced induction ratio of the turbocharger increases and the differential pressure between portions of the intake passage 1 at the upstream side and the downstream side of the compressor 4 increases. By the increase of the differential pressure, the flow rate of the intake air flowing in reverse through the bypass passage 21, that is, the drive gas flow rate in the ejector 22 is increased.

In the present embodiment as well, the drive gas flow rate in the ejector 22 can be increased when the internal combustion engine is at a low temperature at which the degradation oil due to the blow-by gas tends to progress and increasing of the drive gas flow rate in the ejector 22 when the operation range of the internal combustion engine is in the forced induction range. The degradation of the fuel efficiency of the internal combustion engine that accompanies the ventilation of the blow-by gas can thus be suppressed favorably even while suppressing the degradation of oil due to the blow-by gas in the present embodiment as well.

Fifth Embodiment

A blow-by gas ventilation device according to a fifth embodiment of the present invention will now be described with reference to FIG. 7.

In each of the embodiments described above, the flow rate increasing control of the drive gas is performed by increasing the forced induction ratio of the turbocharger by control of the waste gate valve, the assist mechanism, or the variable nozzle vanes. On the other hand, according to the present embodiment, a valve is installed in the bypass passage 21 and the flow rate increasing control is performed by increasing the opening degree of the valve.

Figure 7:
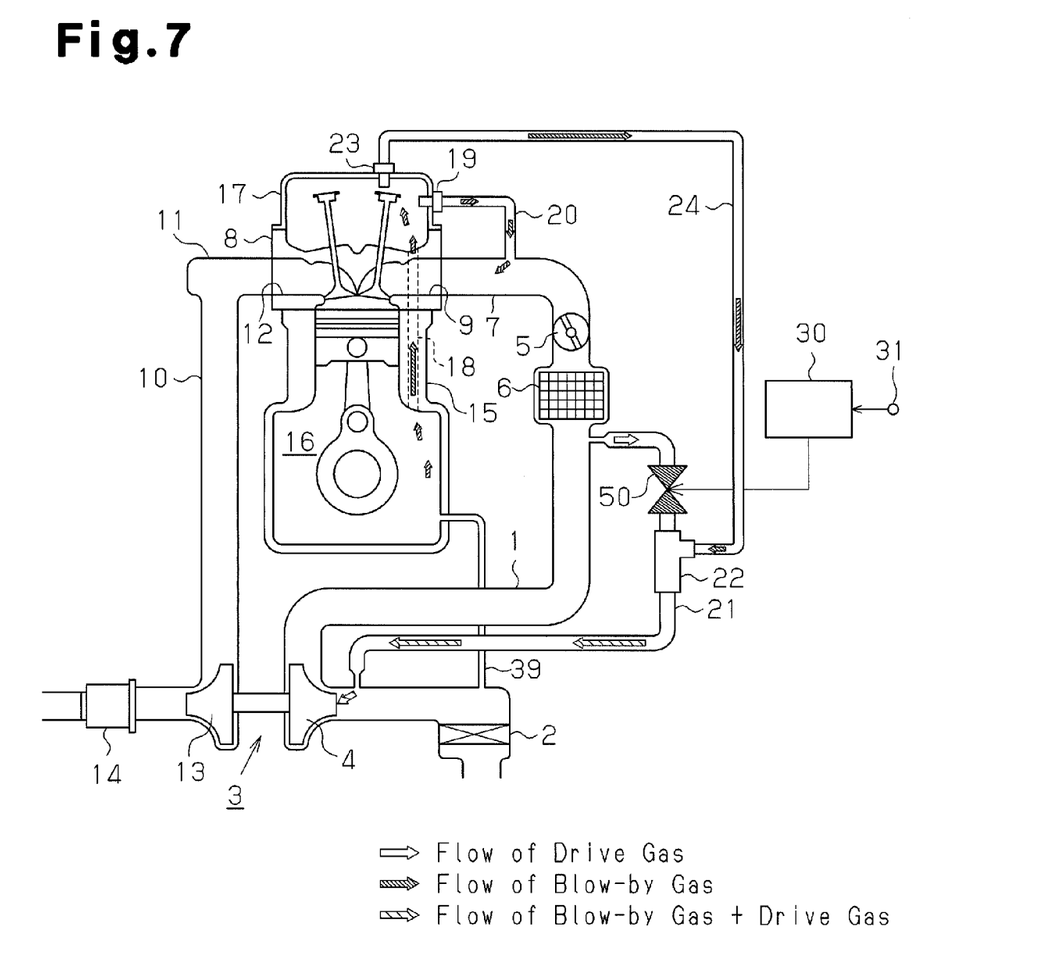
FIG. 7 is a schematic diagram of the configurations of a blow-by gas ventilation device according to a fifth embodiment of the present invention and an internal combustion engine to which the device is applied.

As shown in FIG. 7, besides the points described below, the configurations of the blow-by gas ventilation device according to the present embodiment and the internal combustion engine to which the device is applied are the same as those of the first embodiment shown in FIG. 1. That is, although the first embodiment has the turbocharger 3, which has the waste gate valve 13a provided in the exhaust turbine 13, the fifth embodiment may be configured with or without the waste gate valve 13a. Also, according to the present embodiment, a valve 50 that adjusts the flow rate of the intake air flowing through the bypass passage 21 is installed in the bypass passage 21 connecting the portions of the intake passage 1 at the upstream side and the downstream side of the compressor 4.

As such a valve 50, a motor-operated flow regulating valve is employed in the present embodiment. The valve 50 is controlled by the electronic control unit 31 and the opening degree thereof is changed in accordance with a command from the electronic control unit 31.

In the blow-by gas ventilation device according to the present embodiment configured as described above, the flow rate increasing control of step S102 of FIG. 3 or step S201 of FIG. 4 is performed in the manner shown below. That is, according to the present embodiment, the electronic control unit 31 makes the opening degree of the valve 50 greater than ordinary to increase the flow rate of the intake air flowing through the bypass passage 21, that is, the drive gas flow rate in the ejector 22.

In the present embodiment as well, it is possible to Increase the drive gas flow rate in the ejector 22 when the internal combustion engine is at a low temperature at which the degradation oil due to the blow-by gas tends to progress and increasing of the drive gas flow rate in the ejector 22 when the operation range of the internal combustion engine is in the forced induction range. The degradation of the fuel efficiency of the internal combustion engine that accompanies the ventilation of the blow-by gas can thus be suppressed favorably even while suppressing the degradation of oil due to the blow-by gas in the present embodiment as well.

Sixth Embodiment

A blow-by gas ventilation device according to a sixth embodiment of the present invention will now be described with reference to FIG. 8.

Figure 8:
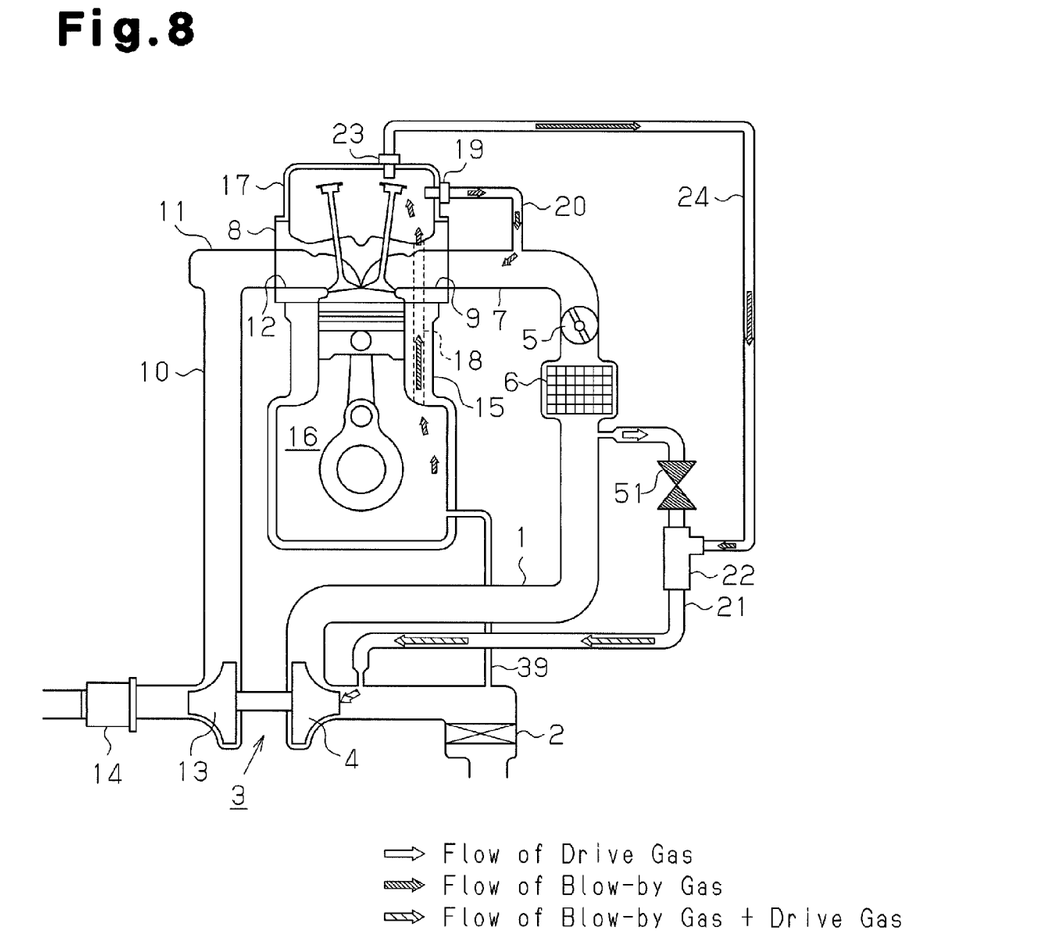
FIG. 8 is a schematic diagram of the configurations of a blow-by gas ventilation device according to a sixth embodiment of the present invention and an internal combustion engine to which the device is applied.

As shown in FIG. 8, the configurations of the blow-by gas ventilation device according to the present embodiment and the internal combustion engine to which the device is applied are basically the same as those of the fifth embodiment shown in FIG. 7. However, according to the present embodiment, a temperature sensitive valve 51 that operates in response to the temperature of the internal combustion engine is employed as the valve provided in the bypass passage 21. The lubricating oil or the cooling water of the internal combustion engine is made to flow about the valve 51 and the valve 51 operates in response to the temperature of the oil or cooling water. The opening degree of the valve 51 increases when the oil or cooling water flowing about the valve 51 decreases.

Operation of the blow-by gas ventilation device according to the present embodiment when the internal combustion engine is operating in the forced induction range will now be described.

When the internal combustion engine is operating in the forced induction range, the electronic control unit 31 closes the first PCV valve 19 and opens the second PCV valve 23. In the meantime in the bypass passage 21, the intake air flows from a portion of the intake passage 1 at the downstream side of the compressor 4 to a portion at the upstream side of the compressor 4 due to the differential pressure between portions of the intake passage 1 at the upstream and downstream of the compressor 4. The ejector 22 operates with the intake air as the drive gas and the blow-by gas inside the crankcase 16 is thereby introduced into the intake passage 1 through the second PCV hose 24.

When the internal combustion engine is at a low temperature at which the degradation of oil due to the blow-by gas tends to progress, the temperature of the oil or water flowing around the valve 51 is also low and the opening degree of the valve 51 provided in the bypass passage 21 is therefore, increased. The intake air flow rate in the bypass passage 21, that is, the drive gas flow rate in the ejector 22 is thus increased and the blow-by gas ventilation ability is improved.

The following advantages are achieved by the present embodiment.

(3) The drive gas flow rate in the ejector 22 is increased only when the internal combustion engine is at a low temperature at which the degradation of oil due to the blow-by gas tends to progress and the degradation of the fuel efficiency of the internal combustion engine that accompanies the ventilation of the blow-by gas can thus be suppressed favorably even while suppressing the degradation of oil due to the blow-by gas.

(4) The increasing of the drive gas flow rate in the ejector 22 when the internal combustion engine is at a low temperature is performed autonomously by the temperature sensitive valve 51. Adjustment of the blow-by gas ventilation ability in accordance with the temperature of the internal combustion engine can thus be performed autonomously without control from the exterior.

The above described embodiments may be modified as follows.

In each of the embodiments, the torque increase of the internal combustion engine that accompanies the increase of the drive gas flow rate is suppressed by reducing the opening degree of the throttle valve 5 when the flow rate increasing control is performed. Obviously, when the drive gas flow rate is increased by a method that does not involve torque increase of the internal combustion engine or when the torque increase of the internal combustion engine that accompanies the increase of the drive gas flow rate is negligibly small, the reduction of the opening degree of the throttle valve 5 during the flow rate increasing control may be omitted.

Although in each of the embodiments, whether or not the internal combustion engine is being operated in the forced induction range is determined by the load factor of the internal combustion engine, this determination may be made using another parameter. For example, whether or not the internal combustion engine is being operated in the forced induction range may be determined according to whether or not the intake pressure of the internal combustion engine is a positive pressure.

Although in each of the embodiments, whether or not the internal combustion engine is at a low temperature is determined by the temperature Tw of the cooling water of the internal combustion engine, this determination may be made using another parameter, for example, using the temperature of lubricating oil of the internal combustion engine, the time elapsed from the startup of the internal combustion engine, or the cumulative intake air amount.

Although in each of the embodiments, the drive gas flow rate in the ejector 22 is increased by adjustment of the opening degree of the waste gate valve, the amount of forced induction assist by the assist mechanism, the opening degree of the variable nozzle vanes, or the opening degree of the valve provided in the bypass passage, the drive gas flow rate in the ejector 22 may be increased by a method besides the above.

In each of the embodiments, the drive gas flow rate increasing control is performed or the increment of drive gas flow rate in the flow rate increasing control performed in accordance with the transition to the forced induction range is increased when the internal combustion engine is at a low temperature that is deemed to be a state in which the degradation of oil by the blow-by gas tends to progress. If there is a state in which the degradation of oil by the blow-by gas tends to progress besides that when the internal combustion engine is at a low temperature, the flow rate increasing control or increase of the increment thereof may be performed in such a state as well.

Although in each of the embodiments, a case of applying the blow-by gas ventilation device according to the present invention to an internal combustion engine that includes a turbocharger as a forced-induction device has been described, the blow-by gas ventilation device according to the present invention may similarly be applied to an internal combustion engine that includes a forced-induction device other than a turbocharger, for example, a supercharger.

DESCRIPTION OF THE REFERENCE NUMERALS

1 . . . intake passage, 2 . . . air cleaner, 3 . . . turbocharger (forced-induction device), 4 . . . compressor, 5 . . . throttle valve, 6 . . . intercooler, 7 . . . intake manifold, 8 . . . cylinder head, 9 . . . air intake port, 10 . . . exhaust passage, 11 . . . exhaust manifold, 12 . . . exhaust port, 13 . . . exhaust turbine, 13a . . . waste gate valve, 14 . . . catalytic converter, 15 . . . cylinder block, 16 . . . crankcase, 17 . . . head cover, 18 . . . blow-by gas passage, 19 . . . first PCV valve, 20 . . . first PCV hose, 21 . . . bypass passage, 22 . . . ejector, 23 . . . second PCV valve, 24 . . . second PCV hose, 25 . . . supply port, 26 . . . nozzle, 27 . . . vacuum chamber, 28 . . . discharge port, 29 . . . diffuser, 30 . . . vacuum port, 31 . . . electronic control unit, 32 . . . water temperature sensor, 33 . . . compressor wheel, 34 . . . shaft, 35 . . . turbine wheel, 36 . . . rotor, 37 . . . stator, 38 . . . coil, 39 . . . fresh air introduction passage, 40 . . . turbine wheel, 41 . . . variable nozzle vane, 42 . . . actuator, 50 . . . valve, 51 . . . temperature sensitive valve.

The invention claimed is:

1. A blow-by gas ventilation device applied to an internal combustion engine having an intake passage, wherein a forced-induction device, which compresses intake air, and a bypass passage, which connects a portion at an upstream side and a portion at a downstream side of the forced-induction device, are provided in the intake passage, the blow-by gas ventilation device comprising:
an ejector configured to operate by using intake air flowing through the bypass passage as a drive gas to vent blow-by gas generated by the internal combustion engine; and
a controller configured to act as a flow rate increasing unit that performs flow rate increasing control for increasing the flow rate of the drive gas when an operation range of the internal combustion engine transitions from a natural aspiration range to a forced induction range,
wherein, when in a state where degradation of oil due to the blow-by gas tends to progress, the controller increases the increment of the drive gas flow rate in the flow rate increasing control in comparison to that when not in the state.

2. The blow-by gas ventilation device according to claim 1, wherein
the forced-induction device is a turbocharger including a waste gate valve that adjusts the flow rate of exhaust that bypasses an exhaust turbine, and
the controller increases the drive gas flow rate by reducing the opening degree of the waste gate valve.

3. The blow-by gas ventilation device according to claim 1, wherein
the forced-induction device includes an assist mechanism that assists forced induction operation, and
the controller increases the drive gas flow rate by increasing the amount of forced induction operation assist by the assist mechanism.

4. The blow-by gas ventilation device according to claim 1, wherein
the forced-induction device is a variable nozzle turbocharger including a variable nozzle vane that adjusts the flow momentum of exhaust blown onto an exhaust turbine, and
the controller increases the drive gas flow rate by reducing the opening degree of the variable nozzle vane.

5. The blow-by gas ventilation device according to claim 1, wherein
a valve for adjusting the flow rate of intake air flowing through the bypass passage is provided in the bypass passage, and
the controller increases the drive gas flow rate by increasing the opening degree of the valve.

6. The blow-by gas ventilation device according to claim 5, wherein the valve is a temperature sensitive valve that operates in response to the temperature of the internal combustion engine.

7. The blow-by gas ventilation device according to claim 1, wherein the controller reduces a throttle opening of the internal combustion engine during the flow rate increasing control.

8. A blow-by gas ventilation device applied to an internal combustion engine having an intake passage, wherein a forced-induction device, which compresses intake air, and a bypass passage, which connects a portion at an upstream side and a portion at a downstream side of the forced-induction device, are provided in the intake passage, the blow-by gas ventilation device comprising:
   an ejector configured to operate by using intake air flowing through the bypass passage as a drive gas to vent blow-by gas generated by the internal combustion engine; and
   a controller configured to act as a flow rate increasing unit that performs flow rate increasing control for increasing the flow rate of the drive gas when an operation range of the internal combustion engine transitions from a natural aspiration range to a forced induction range,
   wherein, when the internal combustion engine is at a low temperature, the controller increases the increment of the drive gas flow rate in the flow rate increasing control in comparison to that when the internal combustion engine is not at a low temperature.

9. The blow-by gas ventilation device according to claim 8, wherein
   the forced-induction device is a turbocharger including a waste gate valve that adjusts the flow rate of exhaust that bypasses an exhaust turbine, and
   the controller increases the drive gas flow rate by reducing the opening degree of the waste gate valve.

10. The blow-by gas ventilation device according to claim 8, wherein
    the forced-induction device includes an assist mechanism that assists forced induction operation, and
    the controller increases the drive gas flow rate by increasing the amount of forced induction operation assist by the assist mechanism.

11. The blow-by gas ventilation device according to claim 8, wherein
    the forced-induction device is a variable nozzle turbocharger including a variable nozzle vane that adjusts the flow momentum of exhaust blown onto an exhaust turbine, and
    the controller increases the drive gas flow rate by reducing the opening degree of the variable nozzle vane.

12. The blow-by gas ventilation device according to claim 8, wherein
    a valve for adjusting the flow rate of intake air flowing through the bypass passage is provided in the bypass passage, and
    the controller increases the drive gas flow rate by increasing the opening degree of the valve.

13. The blow-by gas ventilation device according to claim 12, wherein the valve is a temperature sensitive valve that operates in response to the temperature of the internal combustion engine.

14. The blow-by gas ventilation device according to claim 8, wherein the controller reduces a throttle opening of the internal combustion engine during the flow rate increasing control.

* * * * *